(12) United States Patent
Naaktgeboren

(10) Patent No.: US 9,961,837 B2
(45) Date of Patent: May 8, 2018

(54) AGRICULTURAL BALER WITH A COMMON DRIVE POWERING THE PLUNGER AND THE NEEDLES WITH AN INTEGRATED SAFETY

(71) Applicant: CNH Industrial America LLC, New Holland, PA (US)

(72) Inventor: Adrianus Naaktgeboren, Varsenare (BE)

(73) Assignee: CNH Industrial America LLC, New Holland, PA (US)

(\*) Notice: Subject to any disclaimer, the term of this patent is extended or adjusted under 35 U.S.C. 154(b) by 0 days. days.

(21) Appl. No.: 15/320,514

(22) PCT Filed: Feb. 24, 2015

(86) PCT No.: PCT/EP2015/053843
§ 371 (c)(1),
(2) Date: Dec. 20, 2016

(87) PCT Pub. No.: WO2015/197203
PCT Pub. Date: Dec. 30, 2015

(65) Prior Publication Data
US 2017/0135285 A1    May 18, 2017

(30) Foreign Application Priority Data
Jun. 23, 2014   (BE) .................................. 2014/0487

(51) Int. Cl.
*A01F 15/08*    (2006.01)
*A01F 15/14*    (2006.01)
(Continued)

(52) U.S. Cl.
CPC .......... *A01F 15/0858* (2013.01); *A01F 15/04* (2013.01); *A01F 15/042* (2013.01);
(Continued)

(58) Field of Classification Search
CPC ......... B65B 13/02; B65B 13/18; B65B 13/28; B65B 27/12; B65B 13/26; B30B 9/3003;
(Continued)

(56) References Cited

U.S. PATENT DOCUMENTS 2,604,844 A     7/1952  Hill
2,651,252 A *   9/1953  Pope ....................... A01F 15/14
                                                  100/19 A
(Continued)

FOREIGN PATENT DOCUMENTS

DE      4309275 A1   9/1994
FR       427543 A    8/1911
GB      2219967 A   12/1989
GB      2303818 A    3/1997
WO   2013083519 A1   6/2013

*Primary Examiner* — Jimmy T Nguyen
(74) *Attorney, Agent, or Firm* — Peter K. Zacharias

(57) ABSTRACT

An agricultural baler including a main bale chamber, a plunger configured to compress crop material in the bale chamber, a plunger drive, and a plurality of needles. The plunger drive is drivingly coupled to the plunger. The plurality of needles are configured to deliver twine through the bale chamber. The agricultural baler further includes a pivoting latch system drivingly coupled to both the plunger drive and the needles. A knotter is activated by the needles moving to a predetermined position.

20 Claims, 6 Drawing Sheets

(51) Int. Cl.
  *A01F 15/04* (2006.01)
  *B65B 27/12* (2006.01)
  *B65B 13/26* (2006.01)
  *B65B 13/02* (2006.01)

(52) U.S. Cl.
  CPC ............ *A01F 15/145* (2013.01); *B65B 13/02* (2013.01); *B65B 13/26* (2013.01); *B65B 27/12* (2013.01); *A01F 2015/0866* (2013.01)

(58) Field of Classification Search
  CPC ........ A01F 15/042; A01F 15/12; A01F 15/14; A01F 15/146; A01F 15/0858; A01F 15/04; A01F 2015/0866; A01F 15/145; A01F 2015/143
  USPC .... 100/17, 18, 19 R, 20, 21, 22, 23, 24, 179
  See application file for complete search history.

(56) References Cited

U.S. PATENT DOCUMENTS

| | | | | |
|---|---|---|---|---|
| 2,750,877 | A | * | 6/1956 | Nolt ........................ A01F 15/04 100/19 A |
| 2,957,407 | A | * | 10/1960 | Vutz ....................... A01F 15/08 100/341 |
| 3,027,825 | A | * | 4/1962 | Nolt ........................ A01F 15/14 100/19 R |
| 3,334,577 | A | * | 8/1967 | Majkrzak ................ A01F 15/04 100/19 R |
| 4,075,941 | A | * | 2/1978 | Young .................... A01F 15/14 100/19 R |
| 4,117,775 | A | | 10/1978 | White et al. |
| 2003/0121423 | A1 | | 7/2003 | Murrey et al. |

* cited by examiner

AGRICULTURAL BALER WITH A COMMON DRIVE POWERING THE PLUNGER AND THE NEEDLES WITH AN INTEGRATED SAFETY

CROSS REFERENCE TO RELATED APPLICATION

This application is the National Stage of International Application No. PCT/EP2015/053843 filed Feb. 24, 2015, which claims priority to Belgian Application No. 2014/0487 filed Jun. 23, 2014, the contents of which are incorporated herein by reference.

FIELD OF THE INVENTION

The present invention relates to agricultural balers, and, more particularly, to needle drive systems within such balers.

DESCRIPTION OF THE RELATED ART

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

When enough flakes have been added and the bale reaches a full (or other predetermined) size, a yoke with a number of needles is activated to transfer twine through the plunger behind the last compressed flake of the bale to knotters which are actuated to wrap and tie twine, cord or the like around the bale while it is still in the main bale chamber. The twine is cut and the formed bale is ejected out the back of the baler as a new bale is formed.

In conventional drive systems the knotters are driven by means of a drive shaft-gearbox combination or by a chain drive. When a knotting cycle is required the knotter assembly is coupled through a one-revolution clutch with the main drive which in turn drives the knotter assembly that is synchronized with the plunger. The needles are connected through a crank mechanism with the knotter shaft and hence are driven in a synchronized manner with the knotters. The first part of the sequence of the knotting cycle is used to bring the needles up towards the knotters where, after a certain degree of rotation of the knotter shaft, the different knotter functions start. This first part of the knotter shaft rotation is also used to bring home some functions of the knotter system that were placed in a park position at the end of the second knot sequence and disengagement of the knotter shaft drive since the needles reached home position.

Drive systems for the knotters and the needles typically include a safety/protection device, mostly a shear bolt or other link to break or slip if the drive system encounters a high resistance. Another problem encountered is related to the timing between the needles and the plunger, which if the needles are not withdrawn from the bale chamber in time the plunger with the new, to be compressed wad, will hit the needles causing damage to the needles.

What is needed in the art is an agricultural baler with a knotter drive system which allows the needles and knotter to be driven separately but synchronized in a different phase so the needle drive is optimized with regard to the plunger and the knotter drive is optimized with regard to the needles. Preferably a needle safety system should also be integrated.

SUMMARY OF THE INVENTION

The present invention provides an agricultural baler with a split drive of the needles and knotters by means of a latch system that controls the needle timing and drive and provides an integral safety mechanism.

The invention in one form is directed to an agricultural baler including a main bale chamber, a plunger configured to compress crop material in the bale chamber, a counter crank, and a plurality of needles. The counter crank is drivingly coupled to the plunger. The plurality of needles are configured to deliver twine through the bale chamber. The agricultural baler is characterized by a pivoting latch system drivingly coupled to both the counter crank and the needles. A knotter is activated when the needles reaching a predetermined position.

An advantage of the present invention is that the latch system is robust and economical to produce.

Another advantage is that the latch system ensures that the needles are always withdrawn from the bale by the same drive that powers the plunger.

Yet another advantage is that the needle system and knotters are not driven by the same mechanism allowing both functions to be operated in the most effective way.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
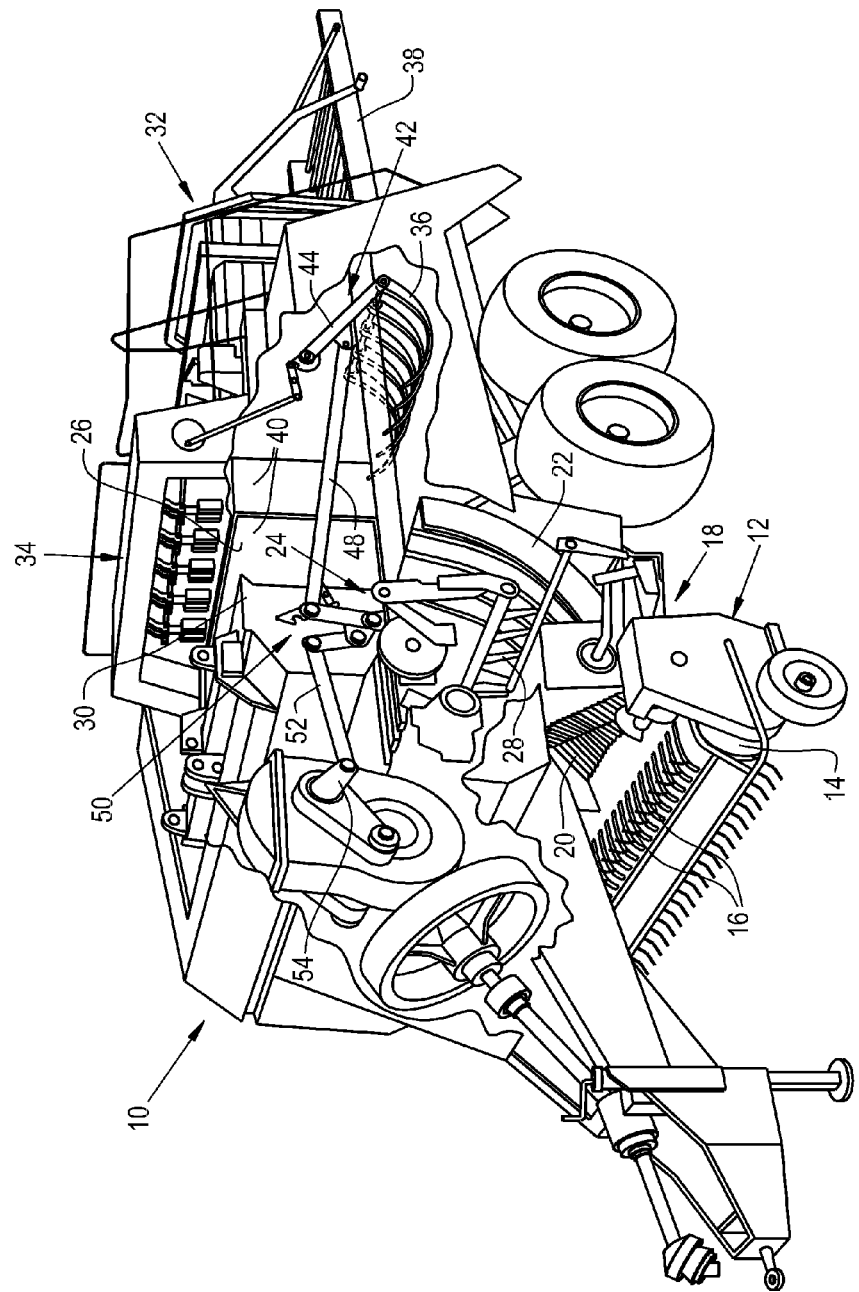
FIG. 1 is a perspective cutaway view showing the internal workings of a large square baler, which may include a latching system of the present invention for triggering the needle movement.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale toward outlet 32 of the main bale chamber 26. The main bale chamber 26 and the plunger 30 function as the second stage for crop compression. When enough flakes have been added and the bale reaches a full (or other predetermined) size, the needles 36 bring the lower twine up around the bale through the plunger 30 and the main bale chamber 26 and deliver the twine to the actuated knotters 34 and the tying process then takes place. The twine is cut and the formed bale progresses through the bale case and is eventually ejected from a discharge chute 38 while the next bale is formed. The main bale chamber 26 includes a pair of side walls 40, between which the bale is formed, and into which the needles 36 extend to carry the twine to the knotters 34.

Referring now to FIGS. 1-5 conjunctively, a needle drive system 42 is further illustrated. Some elements are shown in a schematic fashion and, for the purposes of clarity, some items can be seen as though some items were transparent. The needle drive system 42 includes a support arm 44 pivotally connected to baler 10 about pivot point 46, a drive linkage 48, a safety trigger system 50 and a drive linkage 52. A counter crank 54 is directly coupled to a plunger drive crank which is driving the plunger 30 and here is depicted as being linked, by way of the drive linkage 52, to the safety trigger system 50. The needles 36 are connected to the support arm 44, which pivots about pivot point 46 when the drive linkage 48 pulls the needles 36 around the bale and when the drive linkage 48 pushes the needles 36 back to a home position out of the bale chamber 26. The drive linkage 48 is coupled to safety trigger system 50. A knotter trip system 56 serves to activate the knotters 34 based upon movement of the needles 36, the knotter trip system 56 includes a cam 94, a knotter trip lever 96 and a connecting rod 98 that is coupled to the knotter drive clutch 100. The support arm 44 is coupled to the cam 94 that activates the knotter trip lever 96 which in turn activates the knotter drive clutch 100 by way of the connecting rod 98 connected therebetween. The knotter trip system 56 triggers the knotter drive clutch 100 to initiate a knotting cycle and is coordinated with the passing of the twine to the knotters 34 by the needles 36. The knotter clutch drive 100 is activated by the movement of the needles 36, and the timing is defined by the profile of the cam 94 on the support arm 44. The initiation of the tying sequence by the knotters 34 is controlled by way of this cam 94, hence the clutch 100 that is driving the knotters 34 is activated after the needles 36 have started but once engaged are driven in phase with the needles 36.

Figure 6A:
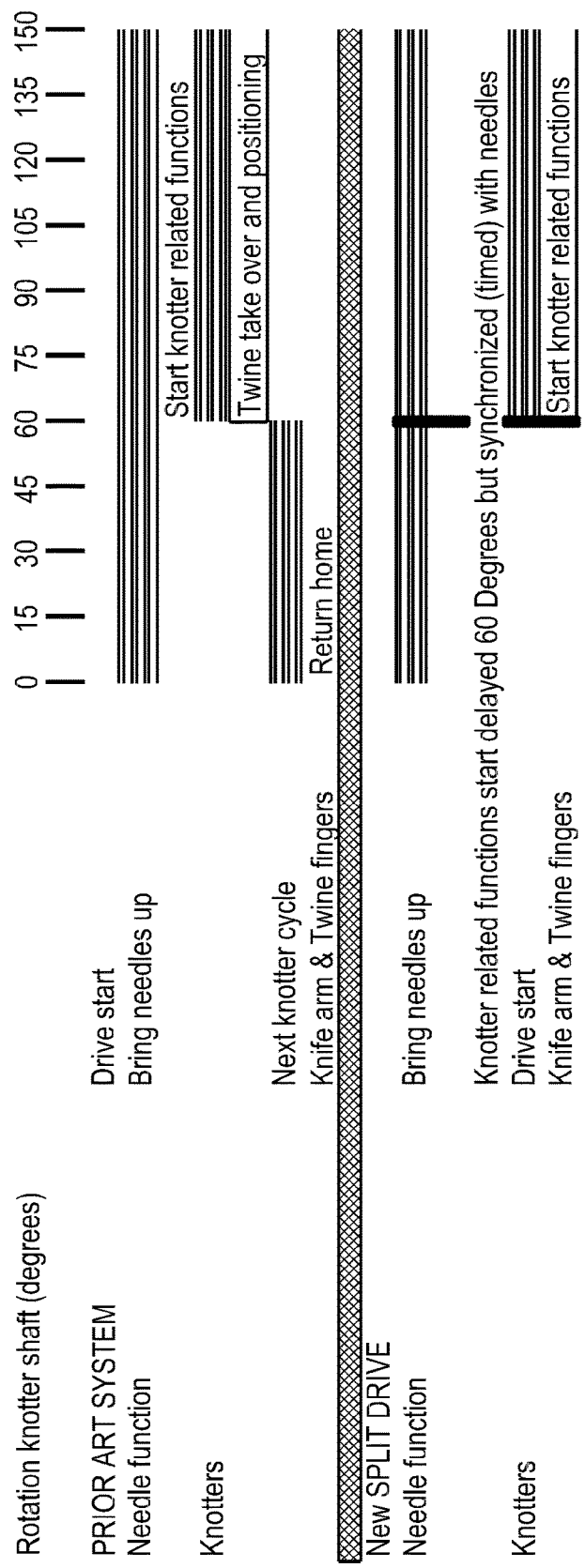
FIGS. 6A and 6B illustrate and contrast the timing of the knotters and the needles in both prior art systems and the present invention.
Figure 6B:
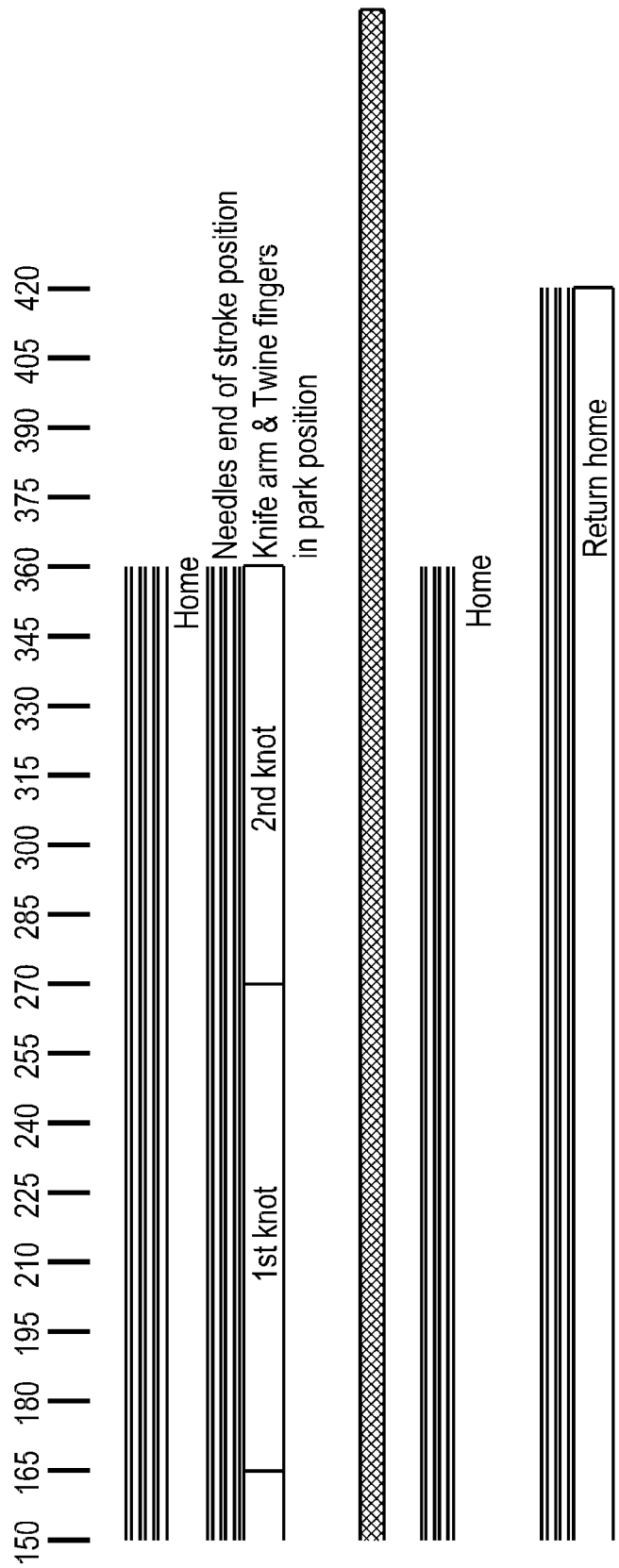

Now, additionally referring to FIGS. 6A and 6B, there is illustrated timing differences between prior art systems and the present invention. Advantageously, the knotters 34 of the present invention are independently driven and can be delayed so that there is more time for the finishing of a second knot, thereby allowing alternate knots to be formed and knotting steps to be undertaken with the extra time. The timing of the knotters 34 is controlled by the movement of the needles to a predetermined position of the needles 36 by way of the cam 94, allowing the knotters 34 to be started during the cycle of the needles 36, and allowing the knotters 34 to finish after the needles 36 return home so that there will be time available to finish off the knot tying process of the second knot. As can be seen in FIGS. 6A and 6B, the knotter functions can continue after the needles have returned home allowing more time for the knotting function to take place. This timing is not possible with the prior art systems, since the needles are driven by the knotter system the function has to be accomplished in one 360° cycle.

Figure 3:
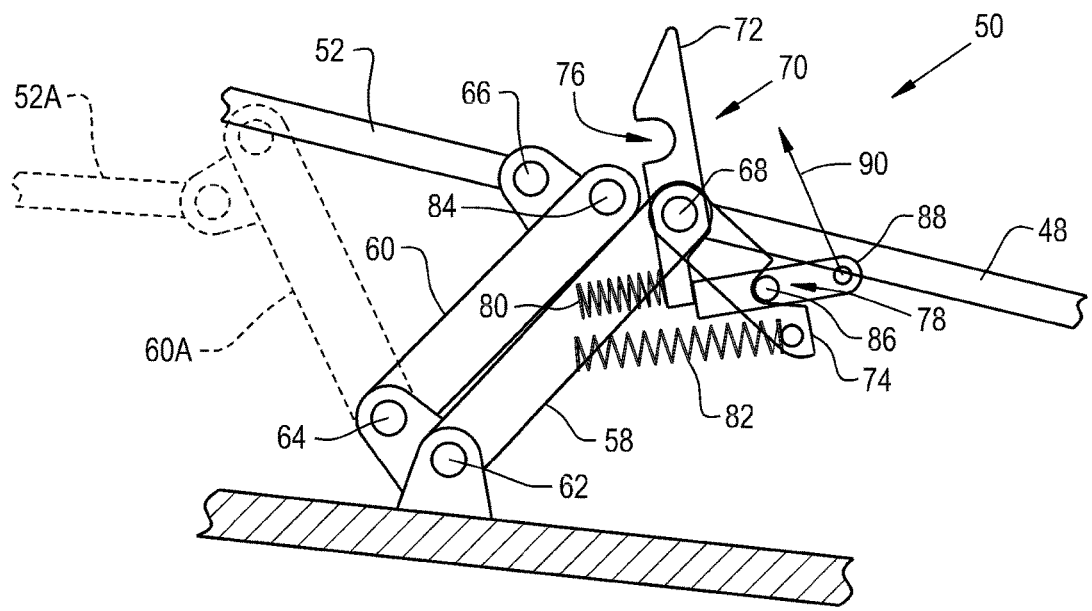
FIG. 3 is another side view of the latch system of the needle drive system shown in FIGS. 1 and 2.

The trigger system 50 includes pivotal links 58 and 60. The pivotal link 58 pivots about a pivot point 62, which is connected to the frame of the agricultural baler 10. The pivotal link 60 is coupled to the pivotal link 58 about a pivot point 64. Additionally the pivotal link 60 is pivotally connected to the drive linkage 52 about a pivot point 66. Similarly, the pivotal link 58 is connected to the drive linkage 48 about a pivot point 68. When the pivotal link 60 is not drivingly coupled to the pivotal link 58, then as the counter crank 54 rotates, pulling and pushing the drive linkage 52, the pivotal link 60 pivots back and forth about the pivot point 64 and does not pull the pivotal link 58 along. However, if the pivotal link 58 has, for any reason, not returned to a home position, along with the needles 36, then pivotal link 60 will push pivotal link 58 to a home position, thus ensuring that the needles 36 are at a home position, ensured by the needles home latch bar 74 locking in with slot 78 to tab 86, thereby keeping the needles 36 from extending into the bale chamber 26. As can be seen in FIG. 3 when a latch bar 72 is kept in an unengaging position by a trip mechanism 88, then the pivotal link 60 can swing to and from the pivotal link 58, as depicted by the position of the pivotal link 60A, as it is moved by the counter crank 54, by way of the drive linkage 52A. The addition of the "A" to the reference number is only for the purpose of denoting an alternate position of those items.

Figure 2:
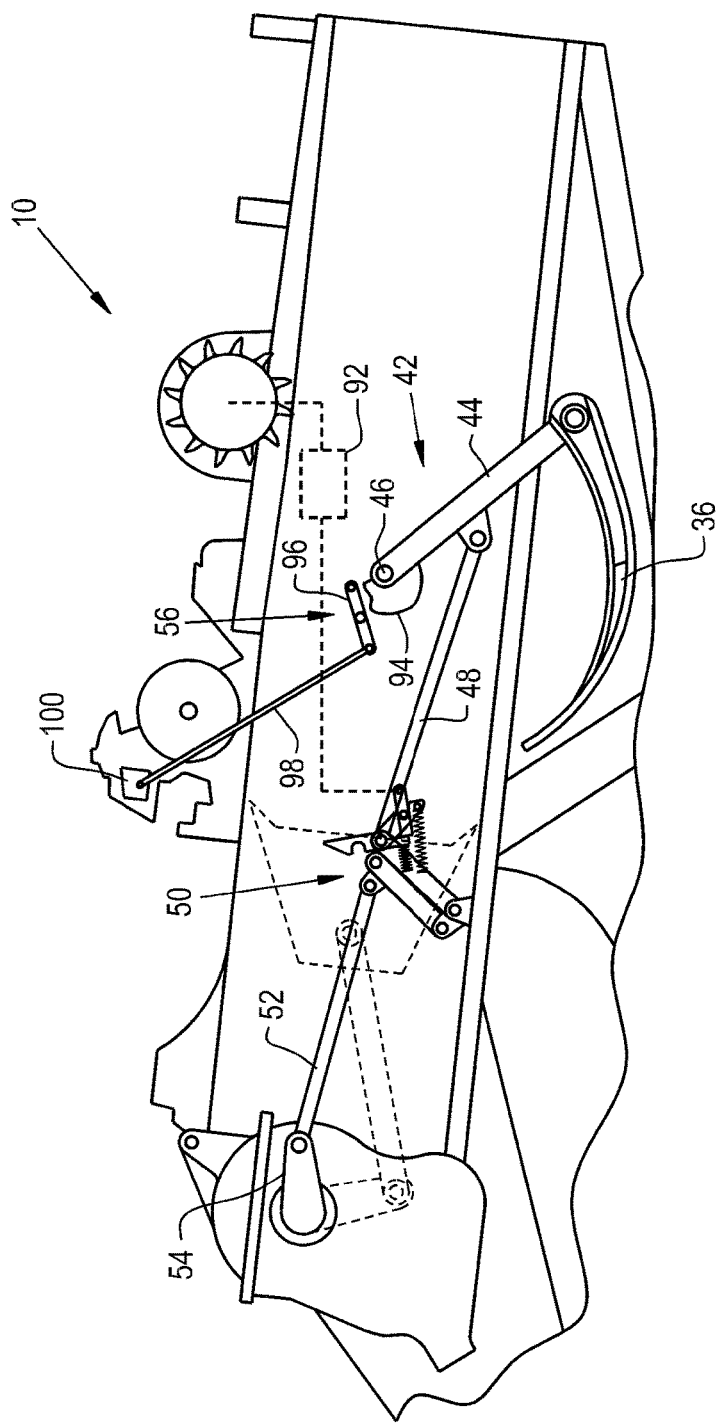
FIG. 2 is a side view of the needle drive system of the baler of FIG. 1 with the latching system shown somewhat schematically.

A pivoting latch system 70 controls the temporary linking of the pivotal link 58 with the pivotal link 60 so that the needles 36 will be cycled to pass the twine to the knotters 34. The pivoting latch system 70 includes latch bars 72 and 74, both of which are illustrated as pivoting about the pivot point 68. The latch bar 72 has a catch slot 76 and the latch bar 74 has a catch slot 78. Compression springs 80 and 82 respectively bias the latch bars 72 and 74. As seen in FIG. 2, the safety trigger system 50 is in a non-driven mode so that the rotation of the counter crank 54 does not drive the needles 36. More specifically in FIG. 3, the catch slot 76 of the latch bar 72 is kept from engaging a catch 84 and the catch slot 78 has engaged a catch 86, with the pivotal link 58 staying in position as the pivotal link 60 pivots back and forth.

Figure 4:
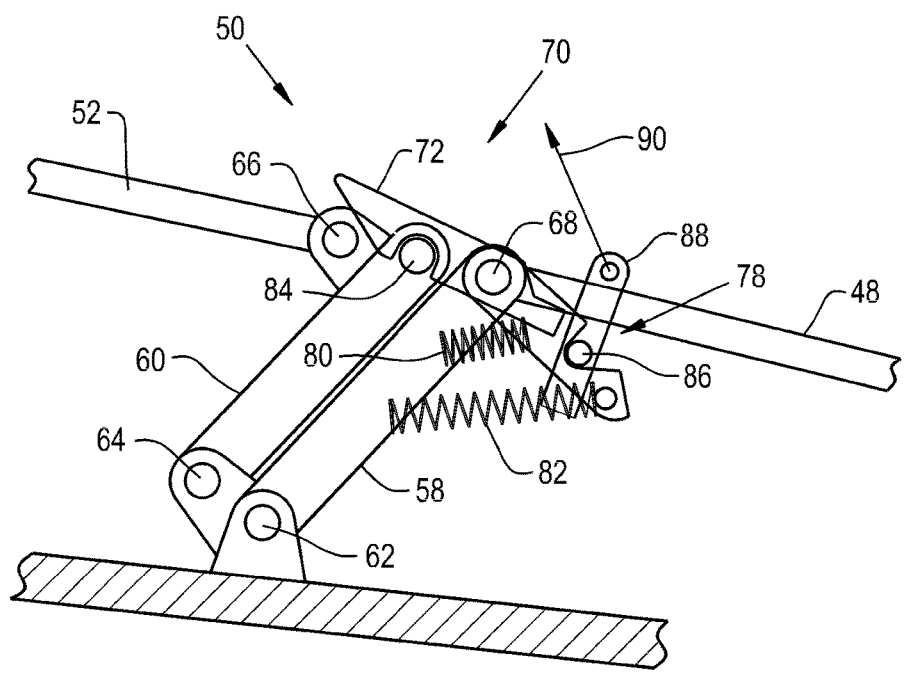
FIG. 4 is yet another side schematical view showing the latch system of FIGS. 1-3 in a different mode.

When the trip mechanism 88 is activated, by way of a trip linkage 90 that is connected to a bale measuring device 92, then the latch bar 72 will engage pivotal link 60 as soon as pivotal link 60 approaches pivotal link 58, which will then connect the drive between the counter crank 54 and the needle support arm 44 (as shown in FIG. 4) and the needles 36 are driven through the bale cavity 26 and then retracted from the bale cavity 26 having threaded the twine to the knotters 34. FIG. 4 shows the point in time when the pivotal link 60 has swung to the right with catch 84 having encountered a ramp portion of the latch bar 72, with catch 84 and catch slot 76 now having engaged each other. The trip linkage 90, which is schematically shown as a line, may be a mechanical linkage, an electrical control, a hydraulically driven linkage or other method of conveying the need to tie the bale. The bale measuring device 92 determines the desired length of the bale and triggers the trip linkage 90 when the predetermined length has been met. The bale length measuring device 92 may be of mechanical, electrical or any other adequate construction. Once the trip mechanism 88 has allowed the pivoting latch system 70 to pivot to the left about the pivot point 62, then the trip mechanism 90 will reset the trip lever 88 in order to then disengage the latch bar 72 from the catch 84 when the pivoting latch system 70 returns to the home position and the latch 74 will rejoin with the slot 78 to the catch 86 to hold the needle support arm 44 in home position as shown in FIGS. 2 and 3.

Figure 5:
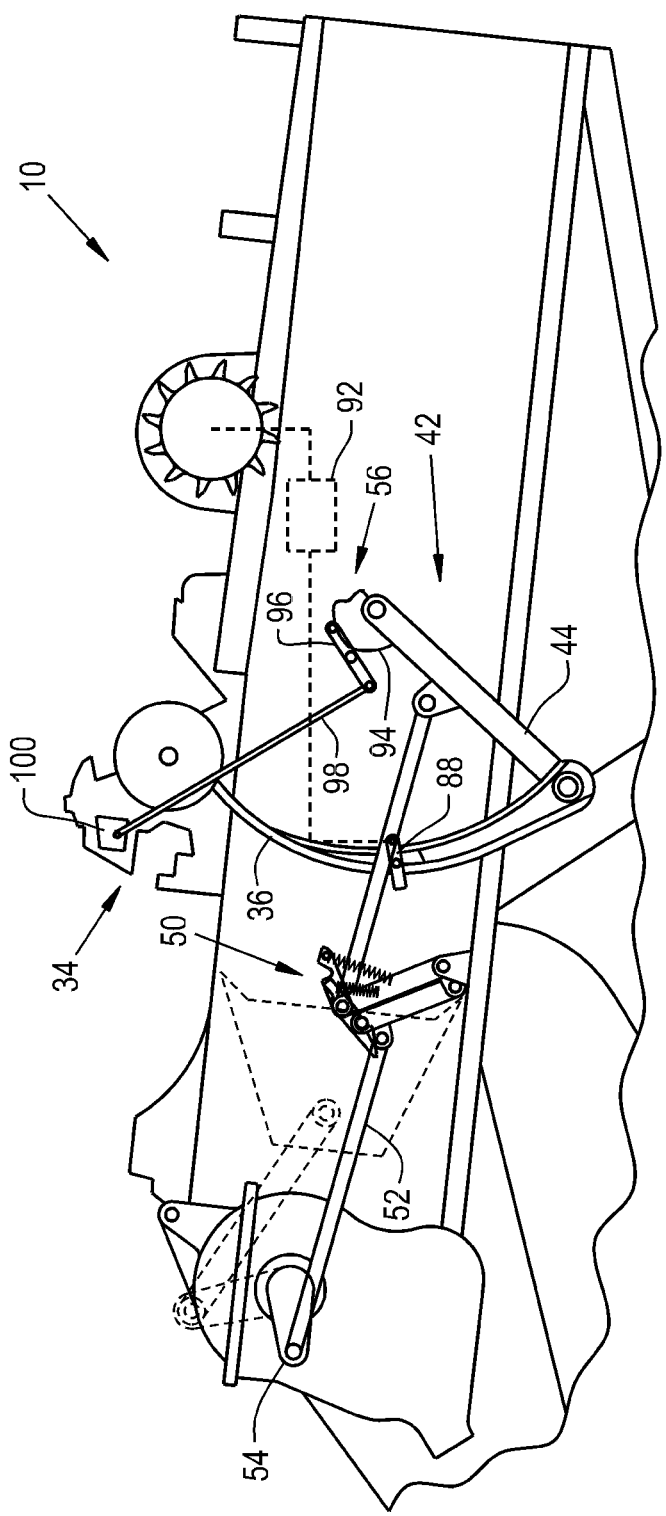
FIG. 5 is a still yet another side schematical view showing the latch system of FIGS. 2-4, causing the needles to be driven.

The movement of the pivoting latch system 70 to the left can be seen in FIG. 5, causing the needles 36 to be drawn clockwise into the bale chamber 26, then retracting therefrom in an opposite direction once the twine is threaded to the knotters 34. It is contemplated that some of the various pivot points may vary in their location and some may be coaxial, which are not shown as such in the illustrations. Conversely, some of the pivot points that are shown as being coaxial may have different locations.

The split of the drive for the needles 36 and the knotters 34 could also be accomplished by 2 independent single revolution clutches where one clutch is driving the needles and is triggered by the bale length measuring device. The second clutch is driving the knotters and is triggered by needle movement. In this case a conventional needle safety system is provided.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
   a main bale chamber;
   a plunger configured to compress crop material in said bale chamber;
   a counter crank drivingly coupled to said plunger;
   a plurality of needles configured to deliver twine through said bale chamber;
   a drive linkage drivingly coupled to the plurality of needles;
   a pivoting latch system drivingly coupled to both said counter crank and the drive linkage of said needles by a plurality of catch bars, each of the catch bars having a catch slot; and
   a knotter activated by said needles moving to a predetermined position.

2. The agricultural baler of claim 1, wherein said pivoting latch system includes a first pivotal link coupled to the drive linkage of said needles and a second pivotal link coupled to said counter crank.

3. The agricultural baler of claim 2, wherein said first pivotal link and said second pivotal link are temporarily coupled to pivot about a common pivot point to drive said needles into said bale chamber.

4. The agricultural baler of claim 3, wherein said second pivotal link pivots independent of said first pivotal link except when being temporarily coupled to said first pivotal link to drive said needles.

5. The agricultural baler of claim 4, wherein said second pivotal link is configured to push said first pivotal link if said needles have not been withdrawn from said bale chamber.

6. The agricultural baler of claim 5, wherein said plurality of catch bars include a first latch bar and a second latch bar, each of which are pivotally coupled to said first pivotal link.

7. The agricultural baler of claim 6, wherein said pivoting latch system further includes a catch on said second pivotal link and a trip mechanism configured to hold said first latch bar away from said catch until said trip mechanism is tripped.

8. The agricultural baler of claim 7, further comprising a bale length measuring device configured to trip said trip mechanism when a bale has reached a desired length.

9. The agricultural baler of claim 7, wherein said pivoting latch system further includes a first biasing member and a second biasing member, said first biasing member being configured to bias said first latch bar toward said catch.

10. The agricultural baler of claim 9, wherein said pivoting latch system further includes a catch on said trip mechanism, said second biasing member being configured to bias said second latch bar toward said catch on said trip mechanism.

11. The agricultural baler of claim 1, wherein said agricultural baler is a large square baler.

12. A pivoting latch system for use in an agricultural baler having a main bale chamber, a plunger configured to compress crop material in the bale chamber, a counter crank drivingly coupled to the plunger, a plurality of needles configured to deliver twine through the bale chamber, a knotter activated by said needles moving to a predetermined position, and a drive linkage drivingly coupled to the plurality of needles, the pivoting latch system comprising:
   a first pivotal link coupled to the drive linkage of the needles;
   a second pivotal link coupled to the counter crank; and
   a plurality of catch bars, each of the catch bars having a catch slot, wherein the pivoting latch system drivingly coupled to both said counter crank and the drive linkage of said needles by the plurality of catch bars.

13. The pivoting latch system of claim 12, wherein said first pivotal link and said second pivotal link are temporarily coupled to pivot about a common pivot point to drive said needles into said bale chamber.

14. The pivoting latch system of claim 13, wherein said second pivotal link pivots independent of said first pivotal link except when being temporarily coupled to said first pivotal link to drive said needles.

15. The pivoting latch system of claim 14, wherein said second pivotal link is configured to push said first pivotal link if said needles have not been withdrawn from said bale chamber.

16. The pivoting latch system of claim 15, wherein the plurality of catch bars comprise a first latch bar pivotally coupled to said first pivotal link; and
   a second latch bar pivotally coupled to said first pivotal link.

17. The pivoting latch system of claim 16, further comprising:
   a catch on said second pivotal link; and
   a trip mechanism configured to hold said first latch bar away from said catch until said trip mechanism is tripped.

18. The pivoting latch system of claim 17, wherein the agricultural baler also includes a bale length measuring device configured to trip said trip mechanism when a bale has reached a desired length.

19. The pivoting latch system of claim 17, further comprising:
   a first biasing member; and
   a second biasing member, said first biasing member being configured to bias said first latch bar toward said catch.

20. The pivoting latch system of claim 19, further comprising a catch on said trip mechanism, said second biasing member being configured to bias said second latch bar toward said catch on said trip mechanism.

* * * * *